US010709058B2

(12) United States Patent
Thompson

(10) Patent No.: US 10,709,058 B2
(45) Date of Patent: Jul. 14, 2020

(54) FLOW CONTROL SYSTEM FOR AN AGRICULTURAL METERING SYSTEM

(71) Applicant: CNH Industrial Canada, Ltd., Saskatoon (CA)

(72) Inventor: Dennis George Thompson, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 994 days.

(21) Appl. No.: 14/841,513

(22) Filed: Aug. 31, 2015

(65) Prior Publication Data

US 2017/0055437 A1    Mar. 2, 2017

(51) Int. Cl.
*A01C 7/10* (2006.01)
*F16D 48/06* (2006.01)
*A01C 7/08* (2006.01)

(52) U.S. Cl.
CPC .............. *A01C 7/102* (2013.01); *A01C 7/081* (2013.01); *F16D 48/06* (2013.01); *F16D 2500/111* (2013.01); *F16D 2500/7109* (2013.01)

(58) Field of Classification Search
None
See application file for complete search history.

(56) References Cited

U.S. PATENT DOCUMENTS

| 3,982,670 A | 9/1976 | Brass |
| 4,592,484 A | 6/1986 | Pregermain |
| 4,601,372 A | 7/1986 | Swales et al. |
| 4,715,302 A | 12/1987 | Briggs |
| 4,926,768 A | 5/1990 | Magda |
| 5,003,894 A | 4/1991 | Lafferty |
| 5,025,951 A | 6/1991 | Hook et al. |
| 5,058,766 A | 10/1991 | Deckler |
| 5,924,371 A | 7/1999 | Flamme et al. |
| 5,937,773 A | 8/1999 | Maddoux et al. |

(Continued)

FOREIGN PATENT DOCUMENTS

| WO | 2013049198 | 4/2013 |
| WO | 2013054295 | 4/2013 |

OTHER PUBLICATIONS

John Deere, Pro-Shaft Drive, http://salesmanual.deere.com/sales/salesmanual/en_NA/seeding/2010/feature/metering/deereplanter/proshaft_drive_story.html, Aug. 24, 2010.

(Continued)

*Primary Examiner* — Jacob S. Scott
(74) *Attorney, Agent, or Firm* — Rebecca L. Henkel; Rickard K. DeMille

(57) ABSTRACT

A flow control system for an agricultural metering system includes a control system configured to be communicatively coupled to at least one clutch. The control system is configured to output a respective pulse-width modulation (PWM) signal to the at least one clutch, the PWM signal is configured to induce the at least one clutch to alternately engage to establish a rotatable connection between a respective drive input and a respective rotatable metering device and to disengage to interrupt the rotatable connection between the respective drive input and the respective rotatable metering device, and the control system is configured to adjust a duty cycle of the respective PWM signal to control a rotation rate of the respective rotatable metering device.

5 Claims, 8 Drawing Sheets

(56) References Cited

U.S. PATENT DOCUMENTS

| | | |
|---|---|---|
| 5,950,550 A | 9/1999 | Luxon |
| 5,969,340 A | 10/1999 | Dragne et al. |
| 5,996,515 A | 12/1999 | Gregor et al. |
| 6,308,645 B1 | 10/2001 | Newkirk et al. |
| 6,851,377 B2 | 2/2005 | Mayerle et al. |
| 7,059,982 B2 | 6/2006 | Jonckheere et al. |
| 7,152,541 B2 | 12/2006 | Ptacek |
| 7,273,016 B2 | 9/2007 | Landphair et al. |
| 7,726,251 B1 | 6/2010 | Peterson et al. |
| 7,735,438 B2 | 6/2010 | Riewerts |
| 8,151,718 B2 | 4/2012 | Mariman et al. |
| 8,196,534 B2 | 6/2012 | Meyer et al. |
| 8,234,988 B2 | 8/2012 | Zielke et al. |
| 8,307,771 B2 | 11/2012 | Cannon et al. |
| 9,402,342 B2 | 8/2016 | Weller et al. |
| 2006/0178177 A1* | 8/2006 | Brome ............... A01D 41/1274 460/59 |
| 2008/0296117 A1* | 12/2008 | Leising ................ F16D 41/06 192/84.6 |
| 2011/0054743 A1 | 3/2011 | Kocer et al. |
| 2011/0198184 A1 | 4/2011 | Barry |
| 2012/0227648 A1* | 9/2012 | Kowalchuk ............ A01C 7/126 111/200 |
| 2012/0240837 A1 | 9/2012 | Garner et al. |
| 2012/0266795 A1 | 10/2012 | Silbernagel et al. |
| 2012/0325131 A1* | 12/2012 | Thompson ............... A01C 7/08 111/178 |
| 2013/0124055 A1 | 5/2013 | Baurer et al. |
| 2014/0158204 A1* | 6/2014 | Thompson ............... A01C 7/04 137/1 |

OTHER PUBLICATIONS http://www..kinze.com/filesimages/Literature/4900.pdf, Kinze 4900 Planter, Kinze Manufacturing, Inc., pp. 1-36, accessed May 26, 2015.

"Instructions for Micro-Trak Seed Rate Control Systems, Used with Trimble Controllers, EZ Boom 2010—Single Section," Micro-Trak Systems, Inc., P/N 50286 Rev A, 2009, pp. 1-12.

20/20 RowFlow, http://agrivisionllc.com/tech-equipment/2020-rowflow/, pp. 1-3, last visited Aug. 22, 2015.

Jafari et al., "Development and Performance Assessment of a DC Electric Variable-Rate Controller for Use on Grain Drills," Computers arid Electronics in Agriculture, Apr. 12, 2010, pp. 1-10, Elsevier.

Park Farms Computer Systems, http://parkfarmscomputer.com/products/seedcommand/, pp. 1-5, 2013.

Kinze Manufacturing Inc., "Kinze Cobalt Planter Control System Display Operator Manual," http://www.business.kinze.com/objectRepository%/7B9D3D945D-B742-4579-AAD0-9F2CE752E21C%7D_Cobalt_M0231_R1011.pdf, pp. 1-40, 2010.

U.S. Appl. No. 14/841,475, filed Aug. 31, 2015, Dennis George Thompson.

* cited by examiner

… (1)

FLOW CONTROL SYSTEM FOR AN AGRICULTURAL METERING SYSTEM

BACKGROUND

The invention relates generally to a flow control system for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube is followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

The meter rollers are typically driven by a drive assembly, which may be configured to control the rotation rate of the meter rollers. However, certain drive assemblies may be expensive to manufacture and/or to install on the air cart (e.g., due to the complexity of the drive assembly), thereby increasing the cost of the air cart. In addition, due to spatial constraints of the air cart, it may be difficult and/or time consuming to mount certain drive assemblies to the air cart and/or to couple the drive assembly to the meter rollers.

BRIEF DESCRIPTION

In one embodiment, a flow control system for an agricultural metering system includes at least one clutch configured to alternately engage and disengage in response to a respective pulse-width modulation (PWM) signal. The at least one clutch is configured to establish a rotatable connection between a respective drive input and a respective rotatable metering device while engaged and to interrupt the rotatable connection between the respective drive input and the respective rotatable metering device while disengaged. The flow control system also includes a control system communicatively coupled to the at least one clutch and configured to output the respective PWM signal. The control system is configured to control a rotation rate of the respective rotatable metering device by adjusting a duty cycle of the respective PWM signal.

In another embodiment, a metering system for an agricultural vehicle includes multiple meter rollers. Each meter roller includes multiple protrusions, and each protrusion is configured to drive agricultural product downwardly in response to rotation of the meter roller. The metering system also includes multiple clutches each configured to alternately engage and disengage in response to a respective clutch control signal. Each clutch is configured to establish a rotatable connection between a respective meter roller and a respective drive input while engaged and to interrupt the rotatable connection between the respective meter roller and the respective drive input while disengaged In addition, the metering system includes a control system communicatively coupled to the clutches and configured to output each respective clutch control signal. The control system is configured to control a rotation rate of each meter roller by adjusting a parameter of the respective clutch control signal.

In a further embodiment, a flow control system for an agricultural metering system includes a control system configured to be communicatively coupled to at least one clutch. The control system is configured to output a respective pulse-width modulation (PWM) signal to the at least one clutch, the PWM signal is configured to induce the at least one clutch to alternately engage to establish a rotatable connection between a respective drive input and a respective rotatable metering device and to disengage to interrupt the rotatable connection between the respective drive input and the respective rotatable metering device, and the control system is configured to adjust a duty cycle of the respective PWM signal to control a rotation rate of the respective rotatable metering device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
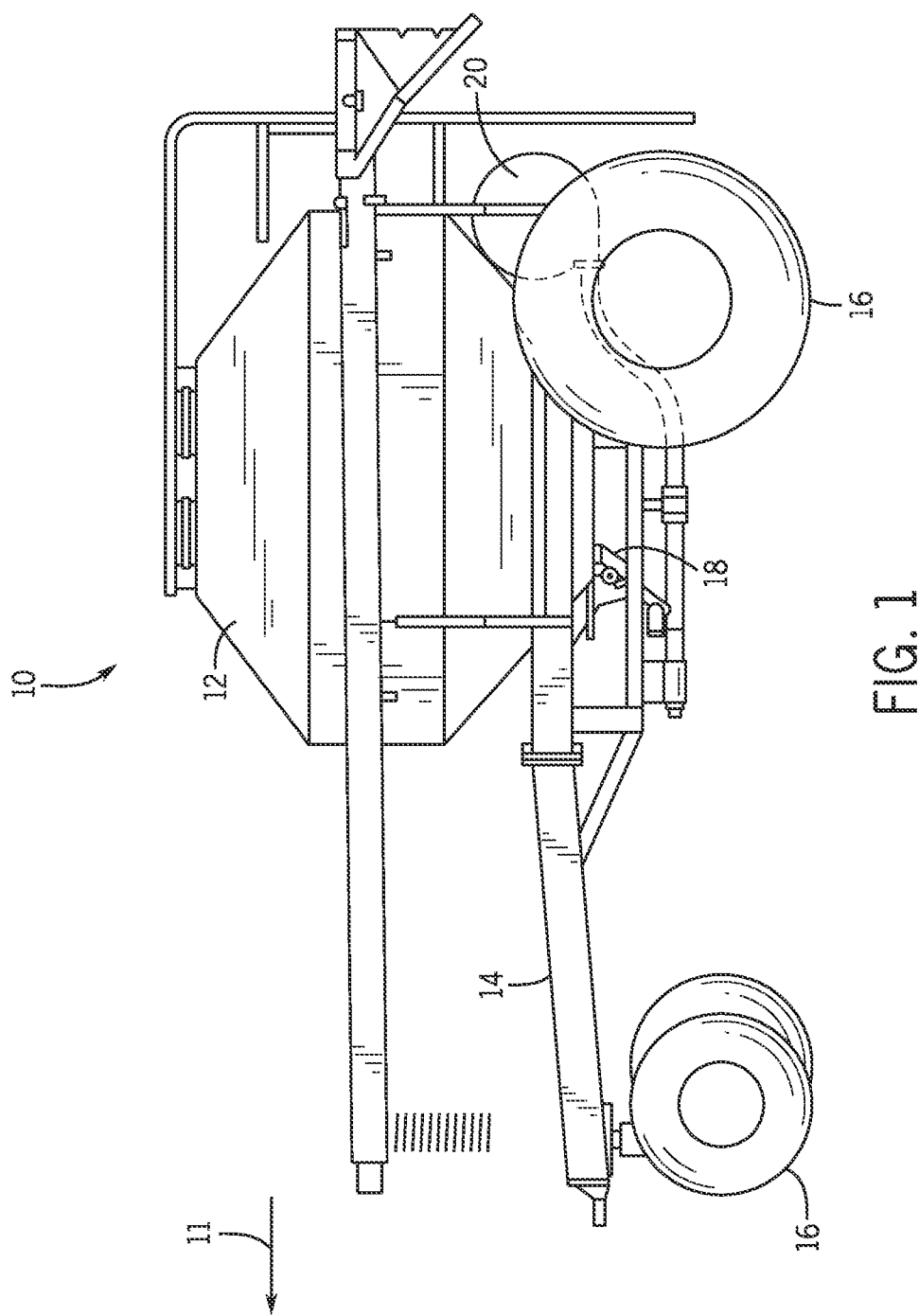
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11. In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or wheat, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
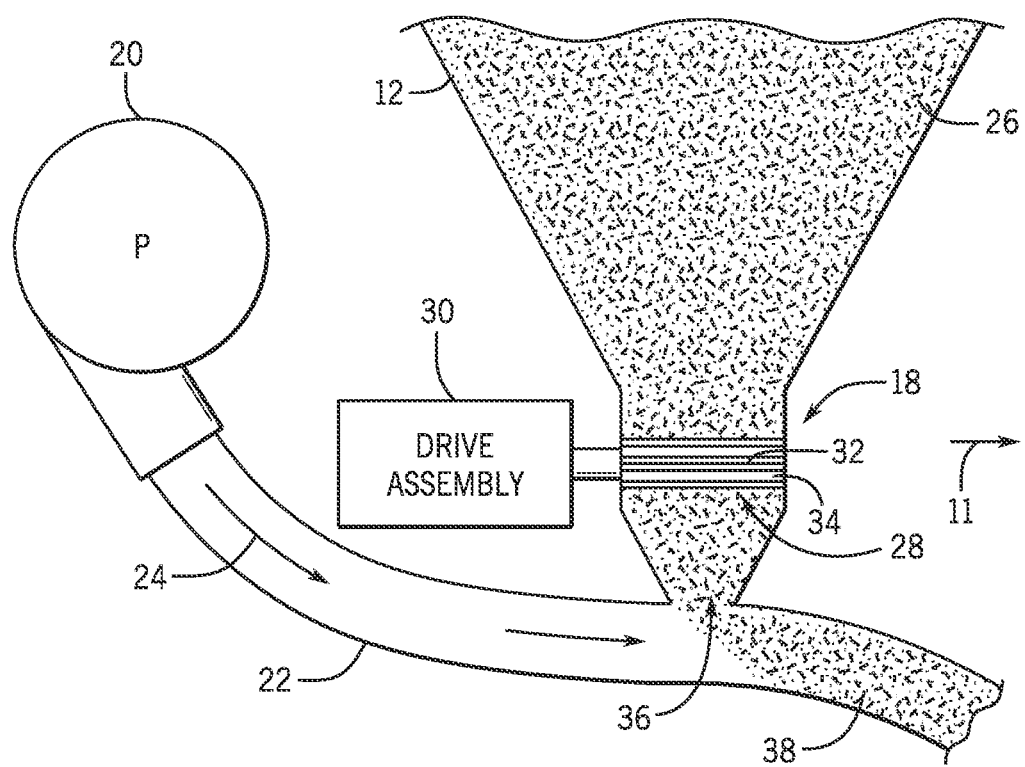
FIG. 2 is a schematic view of an embodiment of a metering system that may be employed within the air cart of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 (e.g., rotatable metering devices) configured to regulate the flow of material 26 into the air flow 24. For example, certain metering systems 18 may include twelve meter rollers 28, each disposed within an independent housing and each configured to flow particulate material into a respective conduit 22 for distribution to one or more respective row units of the agricultural implement. Such metering systems are known as "12-run" metering systems. However, in alternative embodiments, the metering system 18 may include more or fewer meter rollers, e.g., 1, 2, 3, 4, 5, 6, 7, 8, 9, 10, 11, 13, or more.

In the illustrated embodiment, the meter roller 28 is coupled to a drive assembly 30 configured to drive the meter roller 28 to rotate. In certain embodiments, the drive assembly 30 may include a drive unit, such as an electric or hydraulic motor, configured to drive one or more meter rollers to rotate. In further embodiments, the drive assembly 30 may be coupled to a wheel (e.g., via a gear assembly) such that rotation of the wheel 16 drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the material 26 (e.g., agricultural product) disposed within the respective recess 34 downwardly, thereby transferring the material 26 to the conduit 22. The number and geometry of the flutes 32 are particularly configured to accommodate the material 26 being distributed. Certain meter rollers 28 may include six flutes 32 and a corresponding number of recesses 34. Alternative meter rollers may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26. While the illustrated meter roller includes flutes, it should be appreciated that in alternative embodiments, the meter roller may include other protrusions, and/or the recesses may be omitted.

In the illustrated embodiment, the meter roller 28 is oriented substantially parallel to the direction of travel 11 of the air cart. As used herein, substantially parallel may refer to an angle of about 0 to 45 degrees, about 0 to 30 degrees, about 0 to 15 degrees, about 0 to 5 degrees, or about 0 to 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration, the rotation rate of the meter roller 28 controls the flow of material 26 into the air stream 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduits, where the seeds and/or fertilizer are deposited within the soil.

Figure 3:
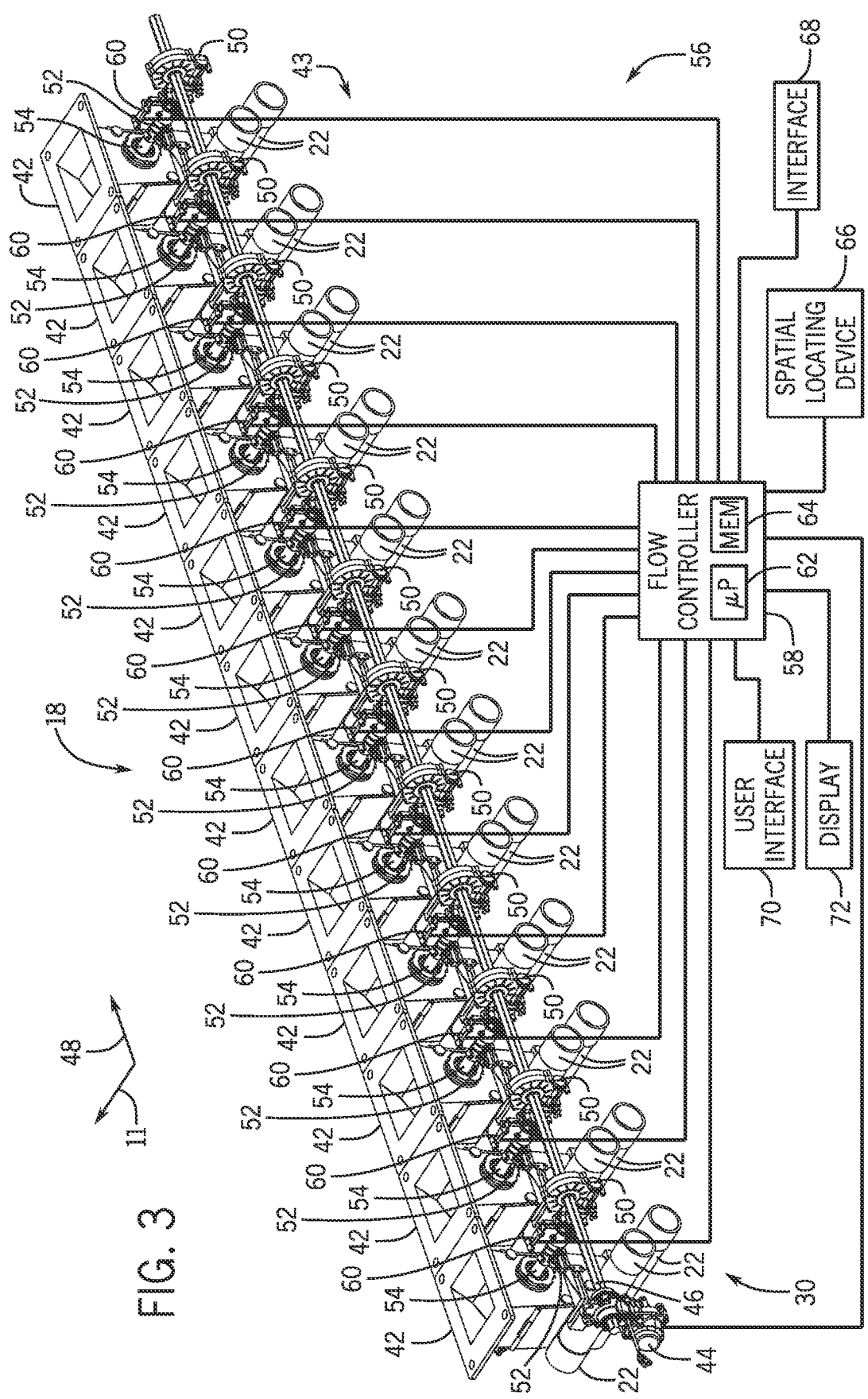
FIG. 3 is a perspective view of an embodiment of a metering system that may be employed within the air cart of FIG. 1.

FIG. 3 is a perspective view of an embodiment of a metering system 18 that may be employed within the air cart of FIG. 1. In the illustrated embodiment, the metering system 18 includes twelve meter rollers, and each meter roller is disposed within a respective housing 42. The housings 42 are configured to receive flowable agricultural material from a common tank compartment and to direct the flowable agricultural material to respective conduits 22. In the illustrated embodiment, each housing 42 is fluidly coupled to two conduits 22. A selector (e.g., within the housing 42) may be configured to direct the agricultural product to one of the two conduits 22, for example. As previously discussed, each conduit 22 is configured to direct the flowable agricultural product to a respective row unit or group of row units for disposition into the soil. In the illustrated embodiment, each meter roller is oriented substantially parallel to the direction of travel 11, and each housing 42 is configured to house a single meter roller. However, it should be appreciated that in certain embodiments, each housing 42 may be configured to house multiple meter rollers (e.g., axially aligned with one another and coupled to a common shaft). While the illustrated metering system 18 includes twelve housings 42, it should be appreciated that in alternative embodiments, the metering system may include more or fewer housings (e.g., 1, 2, 4, 8, 10, 12, 14, 16, 18, 20, or more).

In the illustrated embodiment, the metering system 18 includes a flow control system 43 configured to control the rotation rate of the meter rollers, thereby controlling the flow rate of agricultural product to the row units. The flow control system 43 includes the drive assembly 30, which is configured to drive each meter roller to rotate. In the illustrated embodiment, the drive assembly 30 includes a drive unit 44 configured to drive a drive shaft 46 to rotate. The drive unit 44 may include an electric motor and/or a hydraulic motor, among other suitable drives. For example, in certain embodiments, the drive unit may include a gearbox configured to couple the drive shaft to a wheel of the air cart such that movement of the air cart drives the drive shaft to rotate. In the illustrated embodiment, the drive shaft 46 is oriented substantially perpendicular to the direction of travel 11. Accordingly, the drive shaft 46 is oriented substantially parallel to a lateral axis 48 of the air cart. As used herein, substantially perpendicular may refer to an angle of about 45 to 135 degrees, about 60 to 120 degrees, about 75 to 105 degrees, about 85 to 95 degrees, or about 90 degrees relative to an axis/direction (e.g., the direction of travel 11). In further embodiments, the drive shaft may be oriented substantially parallel to the direction of travel, or at any other suitable angle.

In the illustrated embodiment, the drive assembly 30 also includes multiple gear assemblies 50 configured to drive the respective meter rollers. As discussed in detail below, each gear assembly 50 includes an input coupled to the drive shaft and an output configured to drive a respective meter roller. In addition, a first rotational axis of the input is substantially perpendicular to a second rotational axis of the output. Accordingly, in the illustrated embodiment, each gear assembly 50 is configured to convert rotational motion of the drive shaft 46 about an axis substantially parallel to the lateral axis 48 into rotational motion of a respective meter roller about an axis substantially parallel to the direction of travel 11.

In the illustrated embodiment, a clutch 52 is coupled to each gear assembly 50. Each clutch 52 is configured to alternately engage and disengage in response to a control signal. In addition, each clutch 52 is configured to establish a rotatable connection between the respective meter roller and the output of the respective gear assembly 50 while engaged and to interrupt the rotatable connection between the respective meter roller and the output of the respective gear assembly 50 while disengaged. As used herein, rotatable connection may refer to a connection between parts in which rotation of one part causes the other part to rotate.

The clutches 52 may independently engage and disengage rotation of each meter roller while the drive shaft 46 is rotating, thereby providing sectional control of an implement coupled to the air cart. For example, by disengaging rotation of a meter roller, the output of flowable agricultural product through the respective conduit 22 may be substantially terminated. As a result, output of the flowable agricultural product from row unit(s) that receive the flowable agricultural product from the respective conduit 22 may be terminated. Because each conduit 22 may provide product to a different section of the implement, output of the flowable agricultural product from row unit(s) within each section may be controlled. Furthermore, as discussed in detail below, each clutch 52 may be controlled to adjust the rotation rate of the respective meter roller, thereby controlling the rate at which the flowable agricultural product is transferred from the tank to the respective conduit. In addition, in certain embodiments, one or more of the clutches (e.g., all of the clutches) may be omitted, such that the gear assembly 50 directly drives the respective meter roller.

In the illustrated embodiment, an output of each clutch 52 is coupled to the respective meter roller via a driven shaft 54. In certain embodiments, the driven shaft 54 may be flexible, thereby facilitating an offset (e.g., lateral offset and/or vertical offset) between the clutch output and the meter roller. For example, flexible driven shafts may enable the gear assemblies 50 to be spaced closer together along the drive shaft 46 (e.g., as a tightly spaced group proximate to the drive unit 44). Accordingly, the length of the drive shaft 46 may be reduced, thereby reducing the size of the drive assembly 30. As a result, the drive assembly 30 may utilize less space on the air cart. In further embodiments, one or more driven shafts 54 may be substantially rigid. Furthermore, in certain embodiments, the output of a clutch 52 may be directly coupled to a respective meter roller. Moreover, in certain embodiments, a shaft (e.g., a flexible shaft, a rigid shaft, etc.) may be disposed between the gear assembly and the clutch.

While each component of the drive assembly 30 is positioned behind the housings 42 relative to the direction of travel 11, it should be appreciated that in certain embodiments, one or more components of the drive assembly 30 (e.g., the drive unit 44, the drive shaft 46, the gear assemblies 50, the clutches 52, the driven shafts 54, or a combination thereof) may be positioned in front of the housings relative to the direction of travel 11. For example, in certain embodiments, the air source may be positioned in front of the metering system relative to the direction of travel (e.g., embodiments in which the air cart is configured to be towed between the tow vehicle and the implement). In such embodiments, each component of the drive assembly may be positioned in front of the housings relative to the direction of travel.

In the illustrated embodiment, the flow control system 43 includes a control system 56 configured to control operation of the clutches 52 and the drive unit 44. In the illustrated embodiment, the control system 56 includes a flow controller 58 and multiple clutch controllers 60. As illustrated, each clutch controller 60 is associated with a respective clutch 52 and communicatively coupled to the flow controller 58. The flow controller 58 is also communicatively coupled to the drive unit 44. In certain embodiments, the flow controller 58 is configured to output a respective flow control signal to each clutch controller 60 indicative of a respective target flow rate of the flowable agricultural product, and each clutch controller 60 is configured to output a clutch control signal to the respective clutch 52 based on the respective flow control signal.

In certain embodiments, each clutch 52 is configured to alternately (e.g., cyclically) engage and disengage in response to a respective pulse-width modulation (PWM) signal. For example, each clutch may be controlled by an electromagnetic and/or electromechanical actuator that drives the clutch to engage or disengage in response to an electrical signal. Alternatively, each clutch 52 may be controlled by a hydraulic and/or pneumatic actuator that drives the clutch to engage or disengage in response to fluid pressure. In configurations employing a hydraulic and/or pneumatic actuator, each clutch controller may be communicatively coupled to a respective valve that controls fluid flow to the hydraulic and/or pneumatic actuator. Accordingly, the PWM signal may control the valve, which in turn, induces the actuator (e.g., via fluid flow from the valve to the actuator) to engage or disengage the clutch.

As previously discussed, each clutch is configured to establish a rotatable connection between a respective drive input (e.g., gear assembly output) and the respective meter roller while engaged and to interrupt the rotatable connection between the respective drive input and the respective meter roller while disengaged. The control system 56 is configured to output a respective PWM signal to each clutch to induce the clutch to alternately engage and disengage. The control system 56 is also configured to control a rotation rate of each meter roller by adjusting a duty cycle of the respective PWM signal. For example, the flow controller 58 may output a respective flow control signal to each clutch controller 60 indicative of a respective target flow rate of the flowable agricultural product, and each clutch controller 60 may output a PWM signal to the respective clutch 52 based on the respective flow control signal.

As previously discussed, the flow rate of flowable agricultural product to the conduit 22 is at least partially dependent on the rotation rate of the meter roller. In addition, the duty cycle of the PWM signal to the clutch 52 may control the rotation rate (e.g., rotations per minute, rotations per second, etc.) of the meter roller. For example, the PWM signal may alternate between a first magnitude (e.g., zero magnitude) and a second magnitude (e.g., maximum magnitude). The duty cycle may represent a percentage of time in which the PWM signal is at the second magnitude (e.g., maximum magnitude). The clutch 52 may be configured to disengage while the PWM signal is at the first magnitude and engage while the PWM signal is at the second magnitude. While the clutch 52 is engaged, the meter roller may be driven to rotate (e.g., by the drive unit 44 via the drive shaft 46 and the gear assembly 50), and while the clutch 52 is disengaged, the meter roller may rotate freely (e.g., while experiencing resistance from the flowable agricultural product and/or rotational resistance associated with contact between a meter roller shaft and a bearing surface, etc.) or stop. Accordingly, a higher duty cycle (e.g., higher percentage of time in which the meter roller is driven to rotate) may cause the meter roller to have a higher rotation rate than a lower duty cycle (e.g., lower percentage of time in which the meter roller is driven to rotate). Therefore, the control system 56 may control the rotation rate of each meter roller by adjusting the duty cycle of the PWM signal to each respective clutch 52. In addition, the control system 56 may instruct a meter roller to stop rotating by outputting a PWM signal to the respective clutch having a duty cycle of zero.

In certain embodiments, the control system may be configured to output a continuous signal to each clutch to control the rotation rate of the respective meter roller. For example, certain clutches may be configured to engage, disengage, and partially engage in response to a continuous signal. While the clutch is engaged, a rotatable connection may be established between the drive input and the meter roller, and while the clutch is disengaged, the rotatable connection may be interrupted. In addition, while the clutch is partially engaged (e.g., slipping), a portion of the rotational energy from the drive input may be transferred to the meter roller. In certain clutch configurations, the portion of rotational energy transfer may be controlled by the continuous signal (e.g., by controlling a percentage of clutch engagement). Accordingly, the rotation rate of each meter roller may be controlled by adjusting the engagement (e.g., engaged, disengaged, percentage of engagement) of the respective clutch via the continuous signal.

By way of example, an electromagnetic or electromechanical actuator may be utilized to control a percentage of clutch engagement in response to the continuous signal. In certain configurations, the electromagnetic or electromechanical actuator may drive the clutch to engage upon receiving a continuous signal having a maximum magnitude, drive the clutch to disengage upon receiving a continuous signal having a minimum magnitude (e.g., zero magnitude), and drive the clutch to partially engage upon receiving a continuous signal having a magnitude between the minimum and maximum. For example, the percentage of clutch engagement may be controlled by the magnitude of the signal.

In addition, a hydraulic and/or pneumatic actuator may be employed to drive the clutch to engage, disengage, and partially engage in response to fluid pressure. In configurations employing a hydraulic and/or pneumatic actuator, the clutch controller may be communicatively coupled to a respective valve that controls fluid flow to the hydraulic and/or pneumatic actuator. Accordingly, the continuous signal may control the valve, which in turn, induces the actuator (e.g., via fluid flow from the valve to the actuator) to engage, disengage, or partially engage the clutch. By way of example, a continuous signal having a maximum magnitude may drive the valve to open, thereby providing sufficient fluid pressure to the hydraulic and/or pneumatic actuator to induce the clutch to engage. Furthermore, a continuous signal having a minimum magnitude may cause the valve to close, thereby reducing fluid pressure to the hydraulic and/or pneumatic actuator and causing the clutch to disengage. In addition, a continuous signal having a magnitude between the minimum and maximum may cause the valve to partially open, thereby providing sufficient fluid pressure to the hydraulic and/or pneumatic actuator to induce the clutch to partially engage. For example, the percentage of engagement may be controlled by the magnitude of the signal.

While the clutch is engaged, the meter roller may be driven to rotate (e.g., by the drive unit via the drive shaft and the gear assembly), and while the clutch is disengaged, the meter roller may rotate freely (e.g., while experiencing resistance from the flowable agricultural product and/or rotational resistance associated with contact between a meter roller shaft and a bearing surface, etc.) or stop. In addition, while the clutch is partially engaged, the meter roller may be driven to rotate at a reduced rate (e.g., due to the reduced rotational energy transfer from the gear assembly to the meter roller). For example, the rotation rate of the meter roller may be at least partially dependent on the percentage of clutch engagement. Therefore, the control system may control the rotation rate of each meter roller by adjusting the magnitude of the continuous signal to each respective clutch. In addition, the control system may instruct the meter roller to stop by outputting a continuous signal to the respective clutch having a magnitude of zero.

While the illustrated control system includes a flow controller 58 and clutch controllers 60, it should be appreciated that in certain embodiments, the clutch controllers may be omitted. In such embodiments, the flow controller 58 may output the PWM clutch control signal and/or the continuous clutch control signal to the clutches. For example, the flow controller 58 may determine a target flow rate for each conduit, determine a rotation rate of each respective meter roller to establish the respective target flow rate, and output a continuous signal or a PWM signal to each respective clutch to establish the rotation rate.

In certain embodiments, the flow controller 58 may also control the rotation rate of the drive unit 44. For example, the flow controller 58 may instruct the drive unit 44 to rotate at a speed sufficient to drive each meter roller at a target rotation rate (e.g., a rotation rate that establishes the target product flow rate). In addition, the flow controller 58 may be configured to instruct the drive unit 44 to stop rotating (e.g., during transportation of the air cart), thereby substantially terminating flow of agricultural product from the air cart.

In the illustrated embodiment, the flow controller 58 include a processor, such as the illustrated microprocessor 62, and a memory device 64. The flow controller 58 may also include one or more storage devices and/or other suitable components. The processor 62 may be used to execute software, such as software for controlling the flow control system 43, and so forth. Moreover, the processor 62 may include multiple microprocessors, one or more "general-purpose" microprocessors, one or more special-purpose microprocessors, and/or one or more application specific integrated circuits (ASICS), or some combination thereof. For example, the processor 62 may include one or more reduced instruction set (RISC) processors.

The memory device 64 may include a volatile memory, such as random access memory (RAM), and/or a nonvolatile memory, such as ROM. The memory device 64 may store a variety of information and may be used for various purposes. For example, the memory device 64 may store processor-executable instructions (e.g., firmware or software) for the processor 62 to execute, such as instructions for controlling the flow control system 43. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., prescription maps, etc.), instructions (e.g., software or firmware for controlling the flow control system, etc.), and any other suitable data. Furthermore, in certain embodiments, each clutch controller 60 may also include a process and/or a memory device, among other suitable components (e.g., a storage device, etc.).

In the illustrated embodiment, a spatial locating device 66, such as a global positioning system (GPS) receiver, is communicatively coupled to the flow controller 58. The spatial locating device 66 may be coupled to the air cart, the implement, the tow vehicle, or a combination thereof. The spatial locating device 66 is configured to output a signal indicative of a position of the air cart, the implement, the tow vehicle or a combination thereof. In certain embodiments, the flow controller 58 is configured to output a control signal to each clutch controller 60 based on the position of the implement and a prescription map that includes a target flow rate of agricultural product for each location within a field. For example, for each row unit or group of row units configured to receive agricultural product from a respective conduit 22, the flow controller 58 may determine a target flow rate of product into the respective conduit 22 based on the prescription map and the position of the row unit or group of row units (e.g., as determined based on the position of the spatial locating device and the position of the row unit or group of row units relative to the spatial locating device). For example, the flow controller 58 may identify the location of the row unit or group of row units on the prescription map and output a signal indicative of the target flow rate at the identified location.

In certain embodiments, the prescription map may identify areas where the target flow rate is zero (e.g., at headlands, outside of the field, etc.). When row unit(s) are positioned in such areas, the flow controller 58 may output a control signal to the respective clutch controller 60 indicative of a target flow rate of zero. The clutch controller 60, in turn, may instruct the clutch to disengage, thereby stopping rotation of the respective meter roller such that product flow into the respective conduit is substantially terminated. Furthermore, the flow controller 58 may be configured to output a signal indicative of a target flow rate of zero while the row unit(s) are positioned within an area that has already received agricultural product, thereby substantially reducing or eliminating the possibility of over-application of product. The prescription map be stored in the memory 64 and/or received from an interface 68, which may be configured to communicatively couple the flow controller 58 to a primary air cart controller, to a tractor controller, to an implement controller, or a combination thereof. The interface 68 may be configured to interface with a CAN bus, an ISOBUS, a wireless communication network, or any other suitable communication system.

In the illustrated embodiment, the flow controller 58 is communicatively coupled to a user interface 70 and a display 72. The user interface 70 and the display 72 may be located within a cab of the tow vehicle and/or at a remote site, for example. The user interface 70 and the display 72 may be communicatively coupled to the flow controller 58 by a CAN bus, an ISOBUS, a wireless connection, or any other suitable connection. The user interface 70 may be configured to enable an operator to manually control the product flow rate through each of the conduits 22. In addition, the display 72 may be configured to present the operator with a graphical representation of the product flow rate into the conduits 22 and/or a graphical representation of the prescription map, for example.

Because the illustrated drive system 30 enables the flow control system 43 to drive each seed meter with a single drive unit, the flow control system 43 may be less complex and less expensive to manufacture than drive assemblies that utilize multiple drive units. For example, certain metering systems include an electric or hydraulic motor coupled to each seed meter. In such configurations, the rotation rate of each seed meter may be controlled by adjusting the rotation rate of the respective motor. However, metering systems employing multiple motors may be more expensive and complex than metering systems that utilize a single drive unit. Accordingly, the illustrated flow control system 43, which facilitates individual control of the rotate rate of each meter roller while utilizing a single drive unit, may produce a less costly and less complex meter system.

Moreover, for metering systems in which the meter rollers are directly driven by one or more motors, the meter rollers are typically replaced when switching between agricultural products (e.g., from an agricultural product having a larger particle size to an agricultural product having a smaller particle size). For example, certain motors (e.g., hydraulic motors) have a minimum rotation rate that may be greater than the target rotation rate of the respective meter rollers. Accordingly, driving each meter roller at the minimum rotation rate of the motor may cause the meter roller to deliver more than the target flow rate of agricultural product into the respective conduit. As a result, to achieve the target flow rate (e.g., after switching between an agricultural product having a larger particle size to an agricultural product having a smaller particle size), each meter roller may be replaced with a meter roller having a different configuration (e.g., more flutes, shallower recesses, etc.). Unfortunately, the process of replacing each meter roller may be significantly time-consuming, thereby reducing the efficiency of seeding operations. However, the illustrated flow control system 43, which includes clutches 52 that are controllable to control the rotation rate of each respective meter roller, enables the meter rollers to rotate slower than the rotation rate of the drive unit 44. As a result, each meter roller may be rotated at a respective target rotation rate. Accordingly, agricultural product may be switched (e.g., from an agricultural product having a larger particle size to an agricultural product having a smaller particle size) without replacing the meter rollers, thereby increasing the efficiency of seeding operations.

Figure 4:
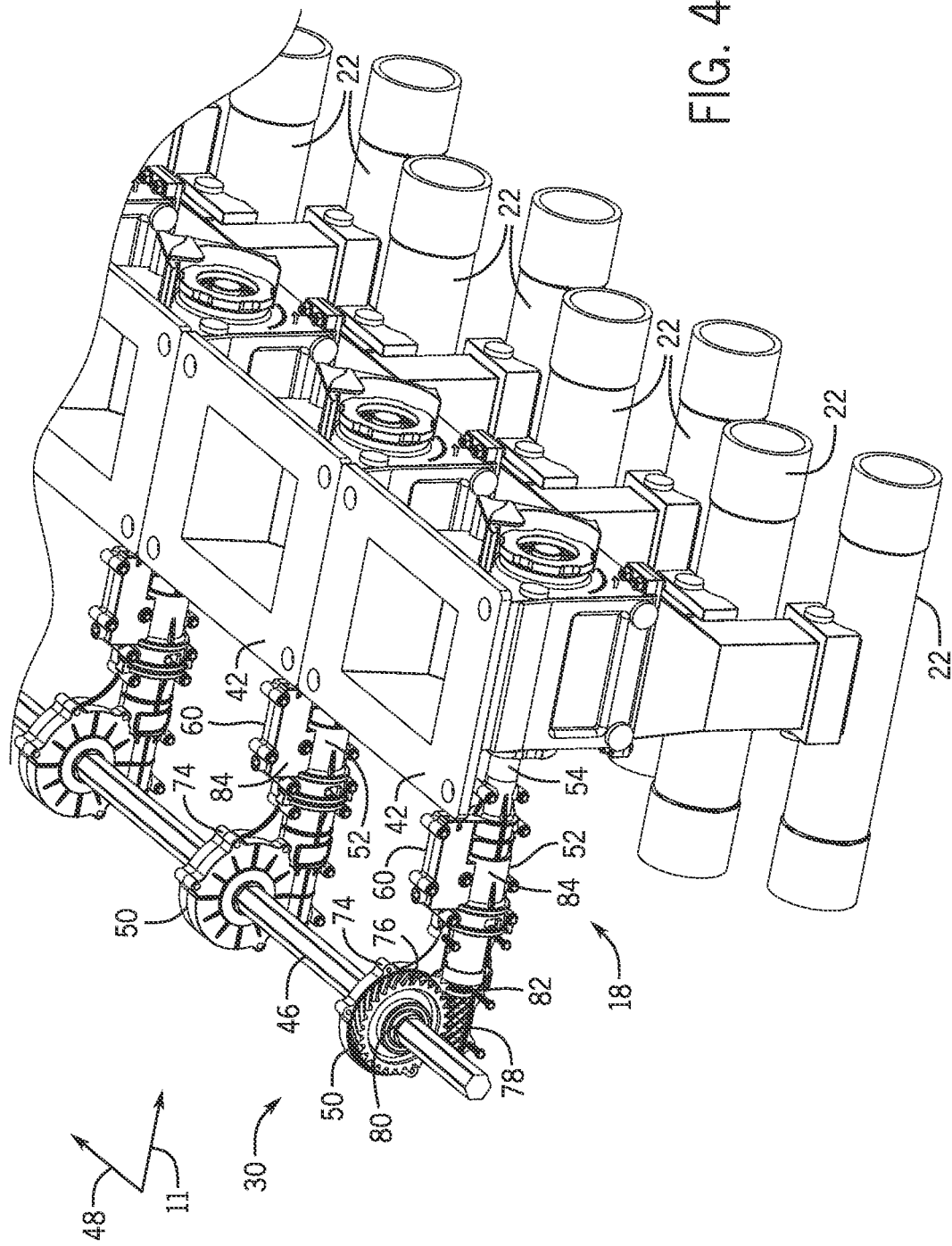
FIG. 4 is a detailed perspective view of the metering system of FIG. 3.

FIG. 4 is a detailed perspective view of the metering system 18 of FIG. 3. In the illustrated embodiment, each gear assembly 50 includes a housing 74, a worm gear 76, and a worm 78. As illustrated, a portion of the housing 74 has been removed from one gear assembly 50 to show the worm gear 76 and the worm 78, which are disposed within the housing 74. As illustrated, the worm gear 76 includes an opening 80 (e.g., input) configured to receive the drive shaft 46. In the illustrated embodiment, the drive shaft 46 has a hexagonal cross-section, and the opening 80 has a corresponding hexagonal shape. Accordingly, rotation of the drive shaft 46 drives the worm gear 76 to rotate about an axis substantially parallel to the lateral axis 48. In addition, teeth of the worm gear 76 engage corresponding grooves of the worm 78. Accordingly, rotation of the worm gear 76 drives the worm 78 to rotate about an axis substantially parallel to the direction of travel 11. The worm 78 includes an output shaft 82 (e.g., output) coupled to the clutch 52. Accordingly, the output shaft 82 may function as a drive input for the clutch 52. While the drive shaft 46 and the opening 80 have a hexagonal shape in the illustrated embodiment, it should be appreciated that in alternative embodiments, the drive shaft and the opening may have other suitable shapes, such as elliptical, square, keyed, or triangular, among others.

In the illustrated embodiment, each clutch 52 and corresponding clutch controller 60 are disposed within a respective housing 84. That is, each housing 84 is configured to house a respective clutch 52 and a respective clutch controller 60. As illustrated, the clutch/clutch controller housing 84 is positioned proximate to the gear assembly housing 74. However, it should be appreciated that in certain embodiments, the gear assembly 50, the clutch 52, and the clutch controller 60 may be housed within a single housing. Moreover, in certain embodiments, the gear assembly 50, the clutch 52, and/or the clutch controller 60 may be housed within separate housings.

Figure 5:
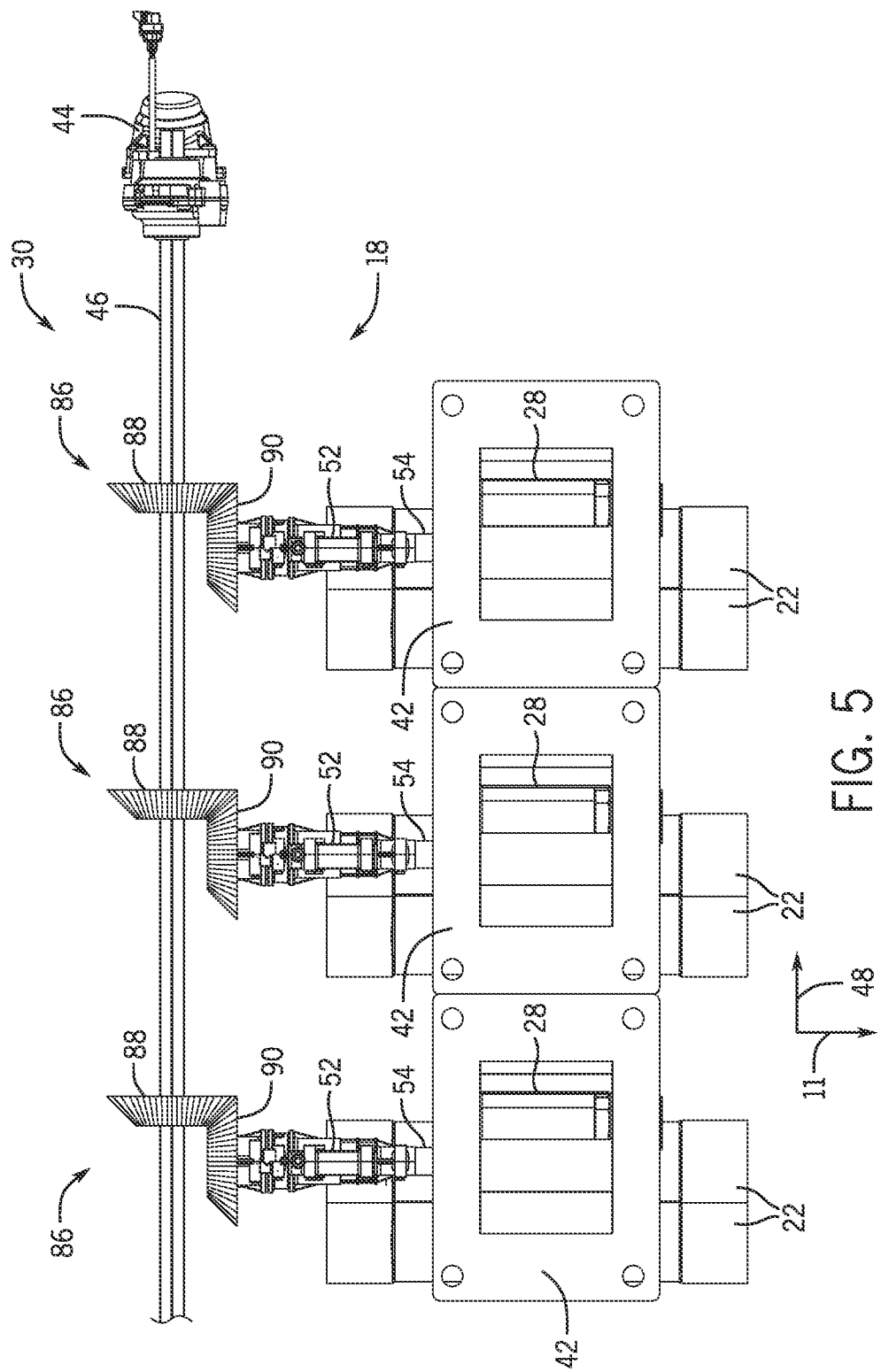
FIG. 5 is a top view of another embodiment of a metering system that may be employed within the air cart of FIG. 1.

FIG. 5 is a top view of another embodiment of a metering system 18 that may be employed within the air cart of FIG. 1. In the illustrated embodiment, the drive assembly 30 includes alternative gear assembly 86, each including a first bevel gear 88 and a second bevel gear 90. As illustrated, the first bevel gear 88 is coupled to the drive shaft 46 (e.g., via an input). Accordingly, rotation of the drive shaft 46 drives the first bevel gear 88 to rotate about an axis substantially parallel to the lateral axis 48. In addition, teeth of the first bevel gear 88 engage corresponding teeth of the second bevel gear 90. Accordingly, rotation of the first bevel gear 88 drives the second bevel gear 90 to rotate about an axis substantially parallel to the direction of travel 11. In certain embodiments, the second bevel gear 90 includes an output shaft (e.g., output) coupled to the clutch 52. Accordingly, the output shaft may function as a drive input for the clutch 52. While the gear assembly 86 does not include a housing in the illustrated embodiment, it should be appreciated that in certain embodiments, a housing may be disposed about the first and second bevel gears.

Figure 6:
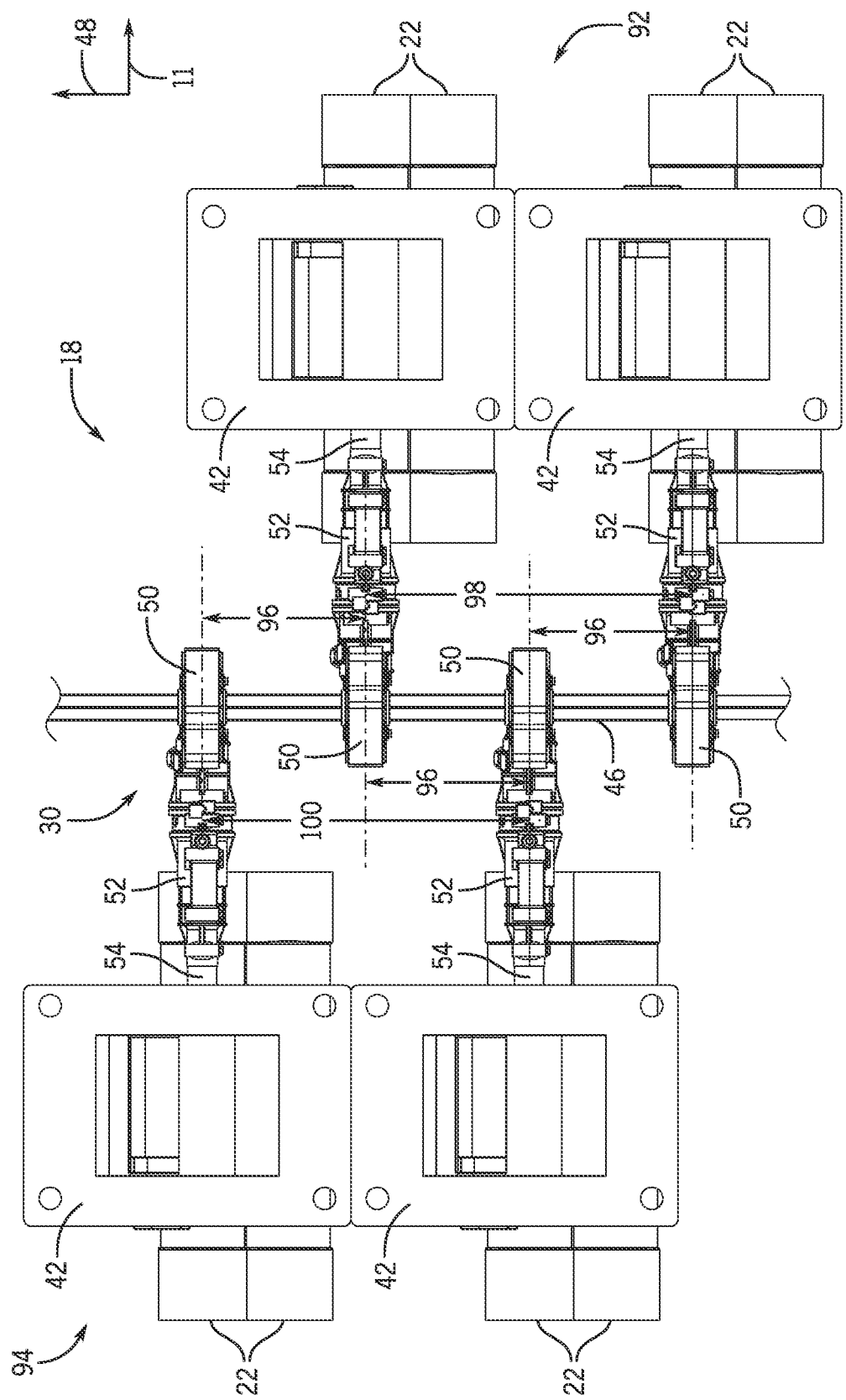
FIG. 6 is a top view of a further embodiment of a metering system that may be employed within the air cart of FIG. 1.

FIG. 6 is a top view of a further embodiment of a metering system 18 that may be employed within the air cart of FIG. 1. In the illustrated embodiment, the drive shaft 46 is oriented substantially perpendicular to the direction of travel 11. Accordingly, the drive shaft 46 is substantially parallel to the lateral axis 48. As illustrated, two housings, each including a meter roller, are positioned on a first side 92 of the drive shaft 46 relative to the direction of travel 11, and two housings 42, each including a meter roller, are positioned on a second side 94 of the drive shaft 46, opposite the first side 92, relative to the direction of travel 11. In the illustrated embodiment, the housings 42 are arranged in an alternating pattern along the lateral axis 48. In addition, each gear assembly 50 on the first side 92 is offset from a corresponding gear assembly 50 on the second side 94 by a centerline-to-centerline offset distance 96. In the illustrated embodiment, the offset distance 96 is about half of the centerline-to-centerline distance 98 between adjacent gear assemblies 50 on the first side 92 and the centerline-to-centerline distance 100 between adjacent gear assemblies 50 on the second side 94. However, it should be appreciated that the offset distance 96 may be larger or smaller in alternative embodiments. Arranging the housings 42 on opposite sides of the drive shaft 46 may substantially reduce the length of the metering system 18, thereby enabling the metering system to be mounted to an air cart having certain spatial constraints (e.g., due to structural members extending along the direction of travel on opposite lateral sides of the metering system). An outlet of the tank/tank compartment providing agricultural product to the housings may be particularly configured to accommodate the positions of the housings.

In certain embodiments, the housings 42 on the first side 92 may be configured to receive agricultural product from a first tank/tank compartment, and the housings 42 on the second side 94 may be configured to receive agricultural product from a second tank/tank compartment. In such embodiments, the flow rate of agricultural product from each tank/tank compartment into respective conduits may be controlled by controlling the respective clutches 52. Accordingly, agricultural product may be metered from two tanks/tank compartments via a single drive assembly 30 (e.g., having a single drive unit and a single drive shaft 46).

While the adjacent housings 42 on the first side 92 are in contact with one another, and the adjacent housings 42 on the second side 94 are in contact with one another, it should be appreciated that in certain embodiments, the housings 42 on the first 92 and/or the housings 42 on the second side 94 may be spaced apart from one another. Furthermore, while the illustrated embodiment includes four housings 42, it should be appreciated that more or fewer housings may be included in further embodiments. For example, the metering system may include twelve housings (e.g., six on the first side and six on the second side), ten housings (e.g., five on the first side and five on the second side), fourteen housings (e.g., seven on the first side and seven on the second side), or any other suitable number of housings. In addition, while the number of housings on the first side is equal to the number of housings on the second side in the illustrated embodiment, it should be appreciated that in certain embodiments, more housings may be positioned on the first side or more housings may be positioned on the second side. Moreover, while the illustrated embodiment includes gear assemblies 50 having worm gears and worms, it should be appreciated that in alternative embodiments, the drive assembly 30 may include one or more gear assemblies having bevel gears.

Figure 7:
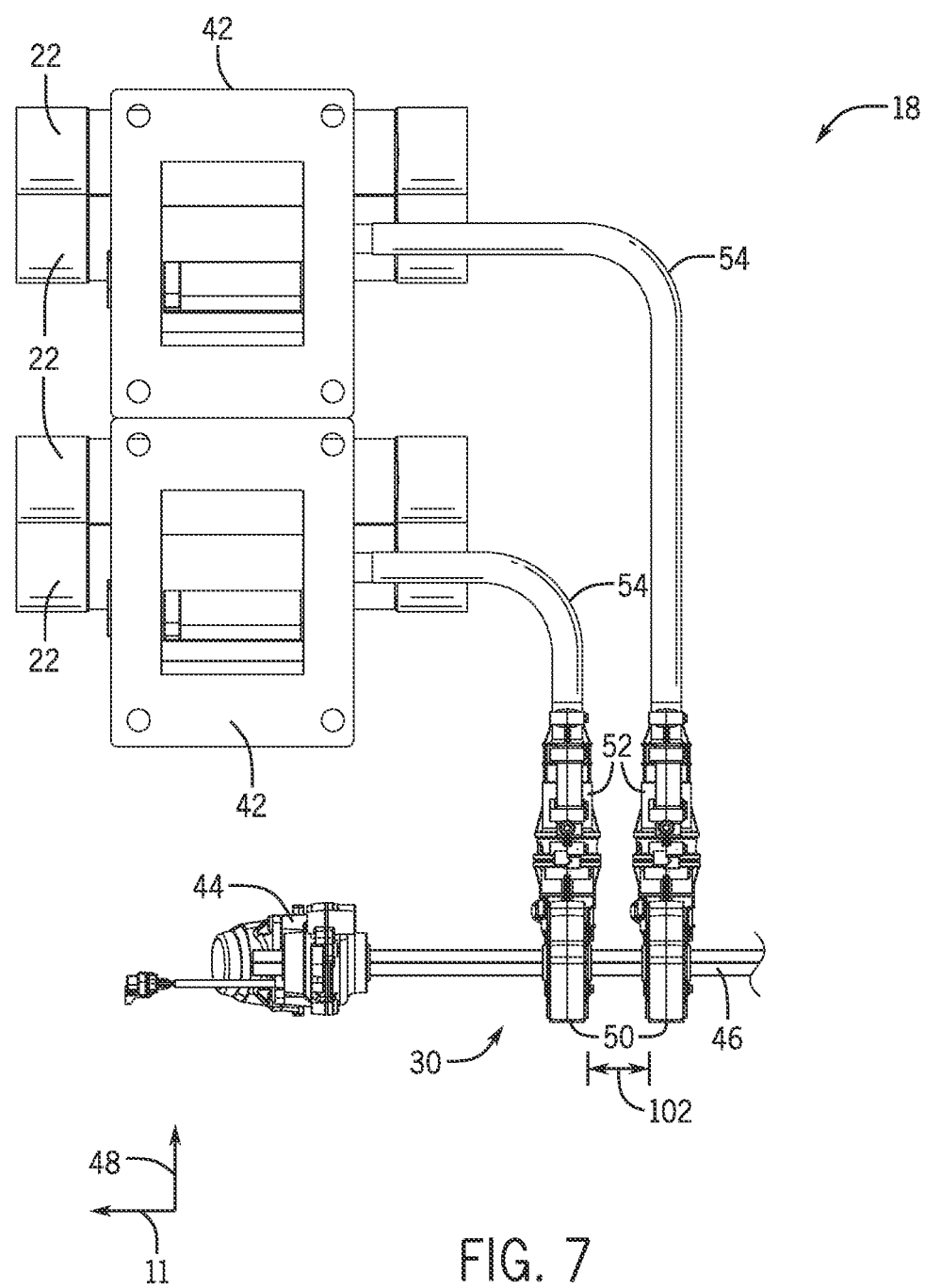
FIG. 7 is a top view of another embodiment of a metering system that may be employed within the air cart of FIG. 1.

FIG. 7 is a top view of another embodiment of a metering system 18 that may be employed within the air cart of FIG.

1. In the illustrated embodiment, a flexible shaft 54 extends from the output of each clutch 52 to the meter roller within the respective housing 42. As illustrated, the flexible shafts 54 enable the gear assemblies 50 and clutches 52 to be positioned remote from the housings 42. For example, in the illustrated embodiment, the drive shaft 46 is oriented substantially parallel to the direction of travel 11. Accordingly, the output of each clutch 52 rotates about an axis substantially parallel to the lateral axis 48. In alternative embodiments, the drive shaft 46 may be oriented at any other suitable angle relative to the direction of travel 11 (e.g., substantially perpendicular to the direction of travel, as shown in FIG. 3). Positioning the drive shaft 46, gear assemblies 50, and clutches 52 remote from the housings 42 may enable the drive system 30 to accommodate spatial constraints within the air cart. For example, if a structural member of the air cart is positioned rearward of the housings, positioning the drive shaft, the gear assemblies, and the clutches remote from the housings and/or at a suitable orientation may enable the drive assembly 30 to accommodate the spatial constraints of the air cart.

Furthermore, the gear assemblies 50 are spaced apart from one another by a separation distance 102. In certain embodiments, the separation distance 102 may be less than the separation distance between gear assemblies 50 in the embodiment described above with reference to FIG. 3. Accordingly, the length of the drive shaft 46 may be reduced, thereby reducing the size of the drive assembly 30. As a result, the drive assembly 30 may utilize less space on the air cart.

Figure 8:
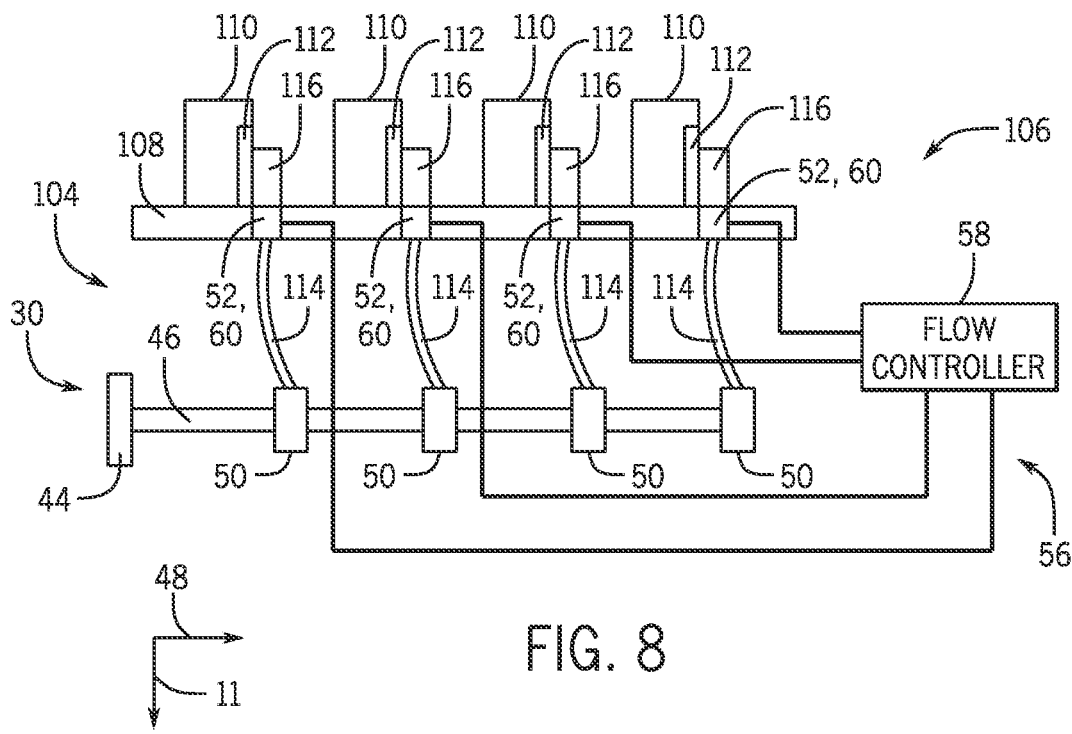
FIG. 8 is a schematic view of an embodiment of a metering system for an agricultural planter.

FIG. 8 is a schematic view of an embodiment of a metering system 104 for an agricultural planter 106. As illustrated, the agricultural planter 106 includes a tool bar 108 and four row units 110 coupled to the tool bar 108. The row units 110 may be configured to receive an unmetered flow of agricultural product from a product tank. For example, certain agricultural planters include an inductor box coupled to the product tank. The inductor box is configured to fluidize the agricultural product, and conduits extending from the inductor box are configured to provide the fluidized agricultural product to the row units. Each row unit 110 includes a seed disc 112 (e.g., of a vacuum seed meter), or other suitable rotatable metering device, configured to meter the agricultural product to a seed tube, which in turn, delivers the product to a trench within the soil. Each row unit 110 may also include an opener configured to form the trench, a closing assembly configured to direct displaced soil into the trench, a packer wheel configured to pack the soil onto the deposited agricultural product, or a combination thereof. While the illustrated agricultural planter 106 includes four row units 110, it should be appreciated that in alternative embodiments, the agricultural planter may include more or fewer row units. For example, in certain embodiments, the agricultural planter may include 1, 2, 4, 6, 8, 10, 12, 16, 18, 20, or more row units.

The agricultural planter 106 includes a drive assembly 30 configured to drive the seed discs 112 to rotate. As illustrated, the drive assembly 30 includes a drive unit 44 and a drive shaft 46 extending from the drive unit 44. In the illustrated embodiment, the drive shaft 46 is oriented substantially parallel to the lateral axis 48. In addition, four gear assemblies 50 are engaged with the drive shaft 46. Each gear assembly 50 includes an input coupled to the drive shaft 46 and an output configured to drive a respective seed disc 112. In addition, a first rotational axis of the input is substantially perpendicular to a second rotational axis of the output. Accordingly, in the illustrated embodiment, each gear assembly 50 is configured to convert rotational motion of the drive shaft 46 about an axis parallel to the lateral axis 48 into rotational motion about an axis parallel to the direction of travel 11.

In the illustrated embodiment, a flexible shaft 114 extends between each gear assembly 50 and a respective clutch 52. A first end of each flexible shaft 114 is coupled to the output of the respective gear assembly 50, and a second end of the flexible shaft 114 is coupled to an input of the clutch 52. An output of each clutch 52 is coupled to a respective second gear assembly 116. Each second gear assembly 116 includes an input coupled to the clutch output and an output configured to drive a respective seed disc 112. In addition, a first rotational axis of the input is substantially perpendicular to a second rotational axis of the output. Accordingly, in the illustrated embodiment, each gear assembly 116 is configured to convert rotational motion of the clutch output about an axis parallel to the direction of travel 11 into rotational motion of a respective seed disc 112 about an axis parallel to the lateral axis 48.

In the illustrated embodiment, each clutch 52 is positioned proximate to the respective second gear assembly 116. However, in certain embodiments, one or more clutches may be positioned proximate to the respective gear assembly 50. In such embodiments, the clutch may be disposed between the gear assembly 50 and the flexible shaft 114. In addition, each flexible shaft may be directly coupled to an input of a respective second gear assembly.

In the illustrated embodiment, a clutch controller 60 is associated with each clutch 52, and each clutch controller 60 is communicatively coupled to the flow controller 58. The flow controller 58 is also communicatively coupled to the drive unit 44. In certain embodiments, the flow controller 58 is configured to output a respective flow control signal to each clutch controller 60 indicative of a respective target flow rate of agricultural product, and each clutch controller 60 is configured to output a clutch control signal (e.g., a continuous signal, a PWM signal, etc.) to the respective clutch 52 based on the respective flow control signal. In certain embodiments, the flow controller 58 may also control the rotation rate of the drive unit 44. As a result, the control system 56 may control the rotation rate of each seed disc 112 (e.g., based on the respective position of the row unit 110 and/or a prescription map). While the illustrated control system 56 includes a flow controller 58 and clutch controllers 60, it should be appreciated that in certain embodiments, the clutch controllers 60 may be omitted, and the flow controller 58 may output clutch control signals directly to the respective clutches.

Figure 9:
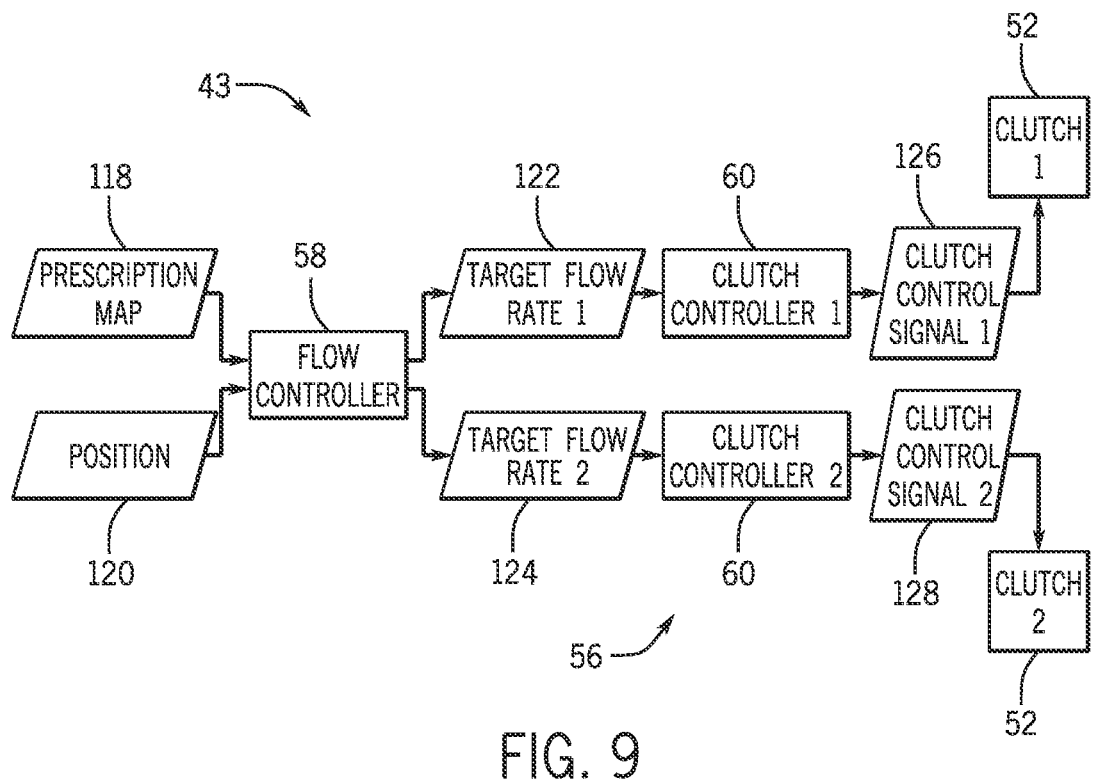
FIG. 9 is a block diagram of an embodiment of a flow control system that may be employed within an agricultural metering system.

FIG. 9 is a block diagram of an embodiment of a flow control system 43 that may be employed within an agricultural metering system. In the illustrated embodiment, the flow controller 58 receives a prescription map 118 (e.g., from an air cart controller) and a position 120 (e.g., from a spatial locating device). The flow controller 58 then determines a target flow rate for each row unit or group of row units configured to receive agricultural product from a respective conduit. In the illustrated embodiment, the flow controller 58 determines a first target flow rate 122 for a first row unit or group of row units positioned at one section of the implement and a second target flow rate 124 for a second row unit or group of row units positioned at another second of the implement. As previously discussed, each target flow rate 122, 124 may be determined based on the prescription map 118 and the position of the row unit or group of row units (e.g., as determined based on the position 120 of the spatial locating device and the position of the row unit or group of row units relative to the spatial locating device). For example, the flow controller 58 may identify the location of each row unit or group of row units on the prescription map and output the respective target flow rate at the identified location.

The flow controller 58 then outputs the first target flow rate 122 to a first clutch controller 60 and the second target flow rate 124 to a second clutch controller 60 (e.g., via respective control signals). Each clutch controller 60, in turn, determines a rotation rate of the respective meter roller or seed disc that establishes the respective target flow rate. Each clutch controller 60 then outputs a respective clutch control signal to establish the determined rotation rate. In the illustrated embodiment, the first clutch controller 60 outputs a first clutch control signal 126 to a first clutch 52, and the second clutch controller 60 outputs a second clutch control signal 128 to the second clutch 52.

In certain embodiments, each clutch control signal includes a PWM signal configured to induce the respective clutch to alternately engage and disengage. In such embodiments, the meter roller or seed disc may be driven to rotate while the clutch 52 is engaged, and the meter roller or seed disc may rotate freely (e.g., while experiencing resistance from the flowable agricultural product and/or rotational resistance associated with contact between a meter roller/seed disc shaft and a bearing surface, etc.) or stop while the clutch 52 is disengaged. Accordingly, a PWM signal having a higher duty cycle may cause the meter roller or seed disc to have a higher rotation rate than a PWM signal having a lower duty cycle. Therefore, each clutch controller 60 may control the rotation rate of the respective meter roller or seed disc by adjusting the duty cycle of the respective PWM signal.

In further embodiments, each clutch control signal includes a continuous signal configured to control engagement of the respective clutch. In such embodiments, a rotatable connection may be established between the drive input and the meter roller or seed disc while the clutch 52 is engaged, and the rotatable connection may be interrupted while the clutch 52 is disengaged. In addition, while the clutch 52 is partially engaged (e.g., slipping), a portion of the rotational energy from the drive input may be transferred to the meter roller or seed disc. In certain clutch configurations, the portion of rotational energy transfer may be controlled by the continuous signal (e.g., by controlling a percentage of clutch engagement). Accordingly, the rotation rate of each meter roller or seed disc may be controlled by adjusting the engagement (e.g., engaged, disengaged, percentage of engagement) of the respective clutch 52 via the continuous signal. While the illustrated flow control system 43 includes two clutch controllers 60 and two clutches 52, it should be appreciated that in alternative embodiments, the flow control system may include more or fewer clutches and a corresponding number of clutch controllers.

While the metering systems described above are configured to drive the meter rollers and seed discs to rotate via a drive assembly that includes a drive shaft and gear assemblies, it should be appreciated that in certain embodiments (e.g., embodiments including clutches controllable by a continuous signal or a PWM signal), the meter rollers and/or seed discs may be driven to rotate by other drive assembly configurations. For example, in certain embodiments, a sprocket or a pulley may be coupled to an input of each clutch, and a chain or belt may engage (e.g., extend about) the sprockets or pulleys. The drive unit may engage the chain or belt (e.g., via a sprocket or pulley) and drive the chain or belt to rotate, thereby providing a rotational input to each clutch.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A flow control system for an agricultural metering system, comprising:
   a plurality of clutches, which each clutch is configured to alternately engage and disengage in response to a respective pulse-width modulation (PWM) signal, and each clutch of the plurality of clutches is configured to establish a rotatable connection between a respective drive input and a respective rotatable metering device while engaged and to interrupt the rotatable connection between the respective drive input and the respective rotatable metering device while disengaged;
   a control system communicatively coupled to the plurality of clutches and configured to output each respective PWM signal, wherein the control system is configured to independently control a rotation rate of each respective rotatable metering device by adjusting a duty cycle of the respective PWM signal, the control system comprises a flow controller and a plurality of clutch controllers, the flow controller is communicatively coupled to each clutch controller of the plurality of clutch controllers, the flow controller is configured to output a respective flow control signal to each clutch controller of the plurality of clutch controllers indicative of a respective target product flow rate, and each clutch controller of the plurality of clutch controllers is configured to output the respective PWM signal based on the respective flow control signal; and
   a plurality of housings, wherein each clutch of the plurality of clutches and a corresponding clutch controller of the plurality of clutch controllers are disposed within a respective housing of the plurality of housings.

2. The flow control system of claim 1, wherein the flow controller is configured to output each respective flow control signal based on a prescription map, a position of at least one row unit configured to receive agricultural product from the agricultural metering system, or a combination thereof.

3. The flow control system of claim 1, comprising a motor configured to drive each respective drive input to rotate.

4. The flow control system of claim 3, wherein the motor is communicatively coupled to the control system, and the control system is configured to control a rotation rate of the motor.

5. The flow control system of claim 1, wherein each respective rotatable metering device comprises a meter roller or a seed disc.

* * * * *